United States Patent [19]
Coelho

[11] Patent Number: 5,530,477
[45] Date of Patent: Jun. 25, 1996

[54] METHOD AND APPARATUS FOR SELECTIVELY OMITTING VIDEO FRAMES DURING PLAYBACK

[75] Inventor: Rohan Coelho, Hillsboro, Oreg.

[73] Assignee: Intel Corporation, Santa Clara, Calif.

[21] Appl. No.: 235,165

[22] Filed: Apr. 29, 1994

[51] Int. Cl.⁶ .............................. H04N 7/30; H04N 7/32
[52] U.S. Cl. .......................................... 348/390; 348/384
[58] Field of Search .................... 348/384, 390, 348/391, 439, 699, 419, 416, 413, 412; 382/233, 236; 395/154; 364/715.02; H04N 7/30, 7/32

[56] References Cited

U.S. PATENT DOCUMENTS

| | | | |
|---|---|---|---|
| 5,253,054 | 10/1993 | Fujiwara et al. | 348/384 |
| 5,363,139 | 11/1994 | Keith | 348/390 |
| 5,384,598 | 1/1995 | Rodriguez et al. | 348/384 |
| 5,418,568 | 5/1995 | Keith | 348/390 |

FOREIGN PATENT DOCUMENTS

| | | | |
|---|---|---|---|
| 0288963 | 11/1988 | European Pat. Off. | H04N 7/32 |
| 0594338 | 4/1994 | European Pat. Off. | H04N 7/30 |
| 0631441 | 12/1994 | European Pat. Off. | H04N 7/30 |

*Primary Examiner*—Tommy P. Chin
*Assistant Examiner*—Vu Le
*Attorney, Agent, or Firm*—William H. Murray; John V. Silverio

[57] ABSTRACT

In a method and apparatus for decompressing with a video decompressor a compressed digital video signal representative of an input sequence of digital video frames, the processing power associated with the video decompressor is determined, and a decompression threshold value is selected from a plurality of candidate decompression threshold values in accordance with the processing power associated with the video decompressor. The video decompressor generates a decompressed digital video output signal in response to the compressed digital video signal, and the decompressed digital video output signal is monitored to determine whether the video decompressor is timely generating an output sequence of decompressed digital video frames. Compressed digital video frames are omitted from the compressed digital video signal provided to the video decompressor in response to the monitoring and in accordance with the decompression threshold.

12 Claims, 10 Drawing Sheets

KEY FRAME PERIODICITY = 1

| | DECOMPRESSION RATE | DECOMPRESSION STRATEGY |
|---|---|---|
| INITIAL STRATEGY | 30 FPS | K K K K K K K K K K ... |
| FIRST BACKOFF | 15 FPS | K (K) K (K) K (K) K (K) K (K) ... |
| SECOND BACKOFF | 10 FPS | K (K) (K) K (K) (K) K (K) (K) K ... |
| THIRD BACKOFF | 7.5 FPS | K (K) (K) (K) K (K) (K) (K) K (K) ... |
| FOURTH BACKOFF | 6 FPS | K (K) (K) (K) (K) K (K) (K) (K) (K) ... |
| FIFTH BACKOFF | 5 FPS | K (K) (K) (K) (K) (K) K (K) (K) (K) ... |

K = KEY FRAME THAT IS DECOMPRESSED
(K) = KEY FRAME THAT IS NOT DECOMPRESSED

*FIG. 7A*

KEY FRAME PERIODICITY = 2

| | DECOMPRESSION RATE | DECOMPRESSION STRATEGY |
|---|---|---|
| INITIAL STRATEGY | 30 FPS | K D K D K D K D K D K D K D K ... |
| FIRST BACKOFF | 15 FPS | K Ⓓ K Ⓓ K Ⓓ K Ⓓ K Ⓓ K Ⓓ K Ⓓ K ... |
| SECOND BACKOFF | 7.5 FPS | K Ⓓ Ⓚ Ⓓ K Ⓓ Ⓚ Ⓓ K Ⓓ Ⓚ Ⓓ K Ⓓ Ⓚ ... |
| THIRD BACKOFF | 5 FPS | K Ⓓ Ⓚ Ⓓ Ⓚ Ⓓ K Ⓓ Ⓚ Ⓓ Ⓚ Ⓓ K ... |

K = KEY FRAME THAT IS DECOMPRESSED
Ⓚ = KEY FRAME THAT IS NOT DECOMPRESSED
D = DIFFERENCE FRAME THAT IS DECOMPRESSED
Ⓓ = DIFFERENCE FRAME THAT IS NOT DECOMPRESSED

*FIG. 7B*

KEY FRAME PERIODICITY = 3

| | DECOMPRESSION RATE | DECOMPRESSION STRATEGY |
|---|---|---|
| INITIAL STRATEGY | 30 FPS | K D D K D D K D D K D D K ... |
| FIRST BACKOFF | 10 FPS | K Ⓓ Ⓓ K Ⓓ Ⓓ K Ⓓ Ⓓ K Ⓓ Ⓓ K ... |
| SECOND BACKOFF | 6 FPS | K Ⓓ Ⓓ Ⓚ Ⓓ Ⓓ K Ⓓ Ⓓ Ⓚ Ⓓ Ⓓ K ... |

K = KEY FRAME THAT IS DECOMPRESSED
Ⓚ = KEY FRAME THAT IS NOT DECOMPRESSED
D = DIFFERENCE FRAME THAT IS DECOMPRESSED
Ⓓ = DIFFERENCE FRAME THAT IS NOT DECOMPRESSED

FIG. 7C

KEY FRAME PERIODICITY = 4

| | DECOMPRESSION RATE | DECOMPRESSION STRATEGY |
|---|---|---|
| INITIAL STRATEGY | 30 FPS | K D D D K D D D K D D D K D D ... |
| FIRST BACKOFF | 7.5 FPS | K Ⓓ Ⓓ Ⓓ K Ⓓ Ⓓ Ⓓ K Ⓓ Ⓓ Ⓓ K Ⓓ Ⓓ ... |

K = KEY FRAME THAT IS DECOMPRESSED
D = DIFFERENCE FRAME THAT IS DECOMPRESSED
Ⓓ = DIFFERENCE FRAME THAT IS NOT DECOMPRESSED

*FIG. 7D*

METHOD AND APPARATUS FOR SELECTIVELY OMITTING VIDEO FRAMES DURING PLAYBACK

FIELD OF THE INVENTION

This invention relates to video signal processing generally and particularly to systems for providing a decompressed digital video signal representative of a full color motion video signal.

BACKGROUND OF THE INVENTION

To enable high quality playback of digital video sequences on high-performance computers, digital video sequences are often recorded and compressed at the maximum frame rate possible (e.g., 30 frames per second). Desktop personal computers often lack sufficient processing power to maintain such maximum frame rates during playback of digital motion video sequences. The platforms and processors in these computers simply function too slowly to decode and display motion video sequences at rates approaching 30 frames per second. The performance of these lower-end systems is further hindered by the fact that, during playback of a motion video sequence, an accompanying digital audio sequence must often also be decoded.

In order to maintain acceptable audio quality during playback, every audio frame in the compressed sequence must be decompressed and output to a sound system. By contrast, it is possible to omit some video frames during playback and still maintain acceptable video quality. However, if during playback video frames are omitted at irregular intervals, the resulting motion video images often suffer from unpleasing skips which make the video images appear jerky.

It is an object of the present invention to dynamically sense during playback whether a decompression system is irregularly omitting frames. If frames are being omitted in an irregular fashion, then it is a further object of the present invention to gradually lower the video frame rate output by the decompression system such that the resulting video which is displayed is as visually pleasing as possible.

It is a further object of the present invention to provide a system for decompressing digital video sequences which can be used on different decompression platforms having differing levels of processing power. It is a still further object of the present invention to provide a system for decompressing digital video sequences which can be selectively configured in response to the processing power of the decompression platform being used.

Further objects and advantages of the invention will become apparent from the description of the invention which follows.

SUMMARY OF THE INVENTION

The present invention is directed to a method and apparatus for decompressing a digital video signal representative of an input sequence of digital video frames. The processing power associated with a video decompressor is determined, and a decompression threshold value is selected from a plurality of candidate decompression threshold values in accordance with the processing power associated with the video decompressor. The video decompressor generates a decompressed digital video output signal in response to the compressed digital video signal, and the decompressed digital video output signal is monitored to determine whether the video decompressor is timely generating an output sequence of decompressed digital video frames. Compressed digital video frames are omitted from the compressed digital video signal provided to the video decompressor in response to the monitoring and in accordance with the decompression threshold.

BRIEF DESCRIPTION OF THE FIGURES

FIG. 7A is a table showing a strategy for gradually reducing the target decompression rate of a compressed digital video sequence comprised entirely of key frames according to a preferred embodiment of the present invention.

FIG. 7B is a table showing a strategy for gradually reducing the target decompression rate of a compressed digital video sequence where every other frame has been encoded as a key frame according to a preferred embodiment of the present invention.

FIG. 7C is a table showing a strategy for gradually reducing the target decompression rate of a compressed digital video sequence where every third frame has been encoded as a key frame according to a preferred embodiment of the present invention.

FIG. 7D is a table showing a strategy for gradually reducing the target decompression rate of a compressed digital video sequence where every fourth frame has been encoded as a key frame according to a preferred embodiment of the present invention.

DETAILED DESCRIPTION OF THE PREFERRED EMBODIMENT

Figure 1:
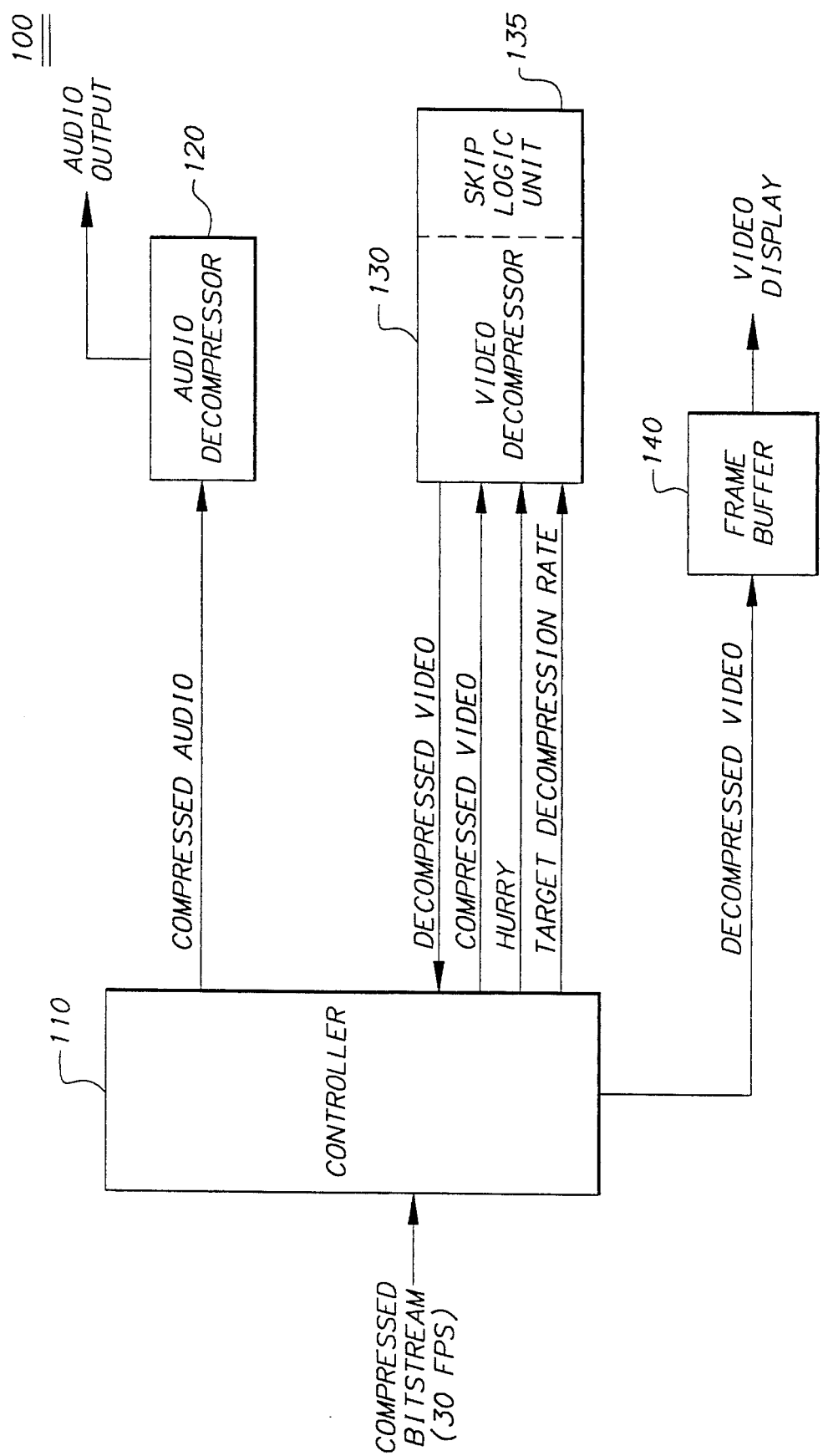
FIG. 1 is a block diagram showing the operation of a video decompression system according to a preferred embodiment of the present invention.

Referring now to FIG. 1, there is shown an overall block diagram of a decompression system 100 according to a preferred embodiment of the present invention. Decompression system 100 includes a controller 110, an audio decompressor 120, a video decompressor 130 and a frame buffer 140. A compressed bitstream (which includes both compressed audio and associated compressed video information) is provided to controller 110, and controller 110 provides a compressed digital audio signal to audio decompressor 120 and an associated compressed digital video signal to video decompressor 130. In response to the compressed digital video signal provided by controller 110, video decompressor 130 provides controller 110 with a decompressed digital video signal. Controller 110 provides a further decompressed digital video signal to frame buffer 140 which is coupled to a video display unit (not shown).

Figure 4:
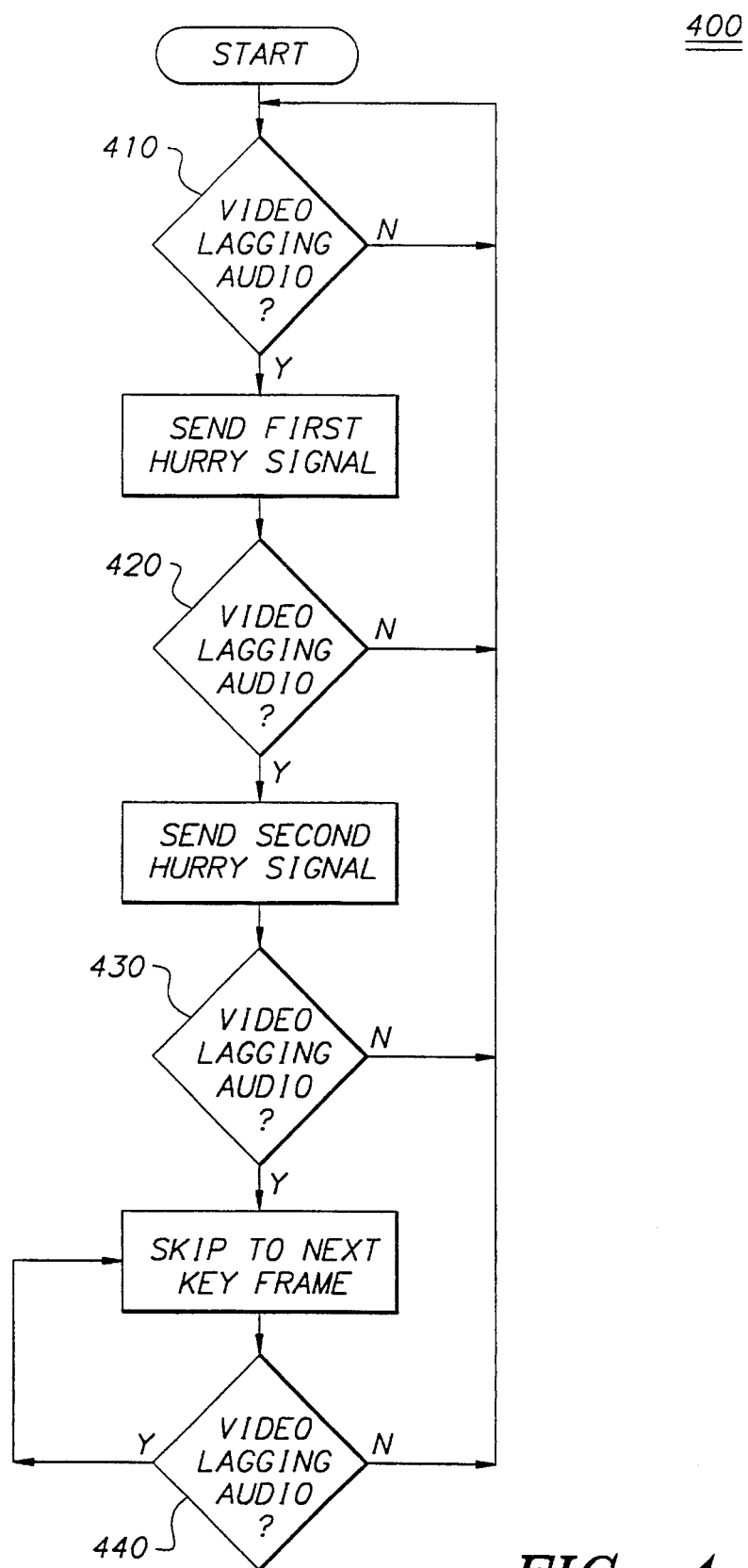
FIG. 4 is a flow diagram showing the operation of a system for adjusting an output decompressed video signal when the output of a video decompressor lags in time behind the output of an associated audio decompressor according to a preferred embodiment of the present invention.

Referring now to FIG. 4, there is shown a flow diagram of a system 400 for adjusting an output decompressed video signal when the video decompressor is not timely generating an output sequence of decompressed digital video frames. In the preferred embodiment, system 400 adjusts an output decompressed video signal when the output of video decompressor 130 lags in time behind the output of audio decompressor 120. System 400 includes a first testing means 410 for determining whether the decompressed digital video signal output by video decompressor 130 is lagging in time behind the output of audio decompressor 120. If first testing means 410 determines that the output of video decompressor 130 is lagging the output of audio decompressor 120 (i.e., if video decompressor 130 is decompressing digital video frames more slowly than audio decompressor 120 is decompressing digital audio frames such that the video frames being output by video decompressor 130 are no longer in sync with associated audio frames being output by audio decompressor 120), then controller 110 sends a first hurry signal to video decompressor 130. Upon receiving this first hurry signal, video decompressor 130 refrains from sending to video controller 110 the next decompressed video frame in the display sequence, video controller 110 then refrains from sending the next decompressed frame in the display sequence to frame buffer 140, and the frame currently residing in frame buffer 140 is redisplayed.

After the first hurry signal is sent, second testing means 420 determines whether the decompressed digital video signal output by video decompressor 130 is still lagging in time behind the output of audio decompressor 120. If second testing means 420 determines that the output of video decompressor 130 is still lagging the output of audio decompressor 120, then controller 110 sends a second hurry signal to video decompressor 130. Upon receiving this second hurry signal, video decompressor 130 refrains from sending to video controller 110 a further decompressed video frame in the display sequence, video controller 110 then refrains from sending a further decompressed frame in the display sequence to frame buffer 140, and the frame currently residing in frame buffer 140 is redisplayed.

Following transmission of the second hurry signal, third testing means 430 determines whether the output of video decompressor 130 is still lagging in time behind the output of audio decompressor 120. If the output of video decompressor 130 is still lagging in time behind the output of audio decompressor 120, then skip logic unit 135 generates a first skip signal. In system 100, skip logic unit 135 is integral with video decompressor 130. In response to this first skip signal, video decompressor 130 skips to the next key frame in the compressed bitstream, and all frames in the compressed bitstream between the current frame and the next key frame are passed over and not decompressed. Thus, in contrast to a hurry signal which simply causes a decompressed frame not be forwarded to controller 110, a skip signal causes one or more compressed frames to be skipped (and not decompressed) by video decompressor 130. Fourth testing means 440 causes skip logic unit 135 to continue generating further skip signals until such time as the output of video decompressor 130 ceases to lag in time behind the output of audio decompressor 120. Although in the preferred embodiment of system 400, two hurry signals are generated before any skip signals are generated, in an alternate embodiment (not shown) N consecutive hurry signals may be sent to video decompressor 130 before any skip signals are generated, where N is any integer that is greater than or equal to zero.

Although in the preferred embodiment, system 400 determines whether video decompressor 130 is timely generating an output sequence of decompressed video frames by monitoring the output of video decompressor 130 and comparing that video decompressor output to the output of audio decompressor 120, it will be understood by those skilled in the art that the present invention may determine whether video decompressor 130 is timely generating an output sequence of decompressed video frames by monitoring the output of video decompressor 130 and comparing that video decompressor output to timing signals generated by a system clock.

Figure 2:
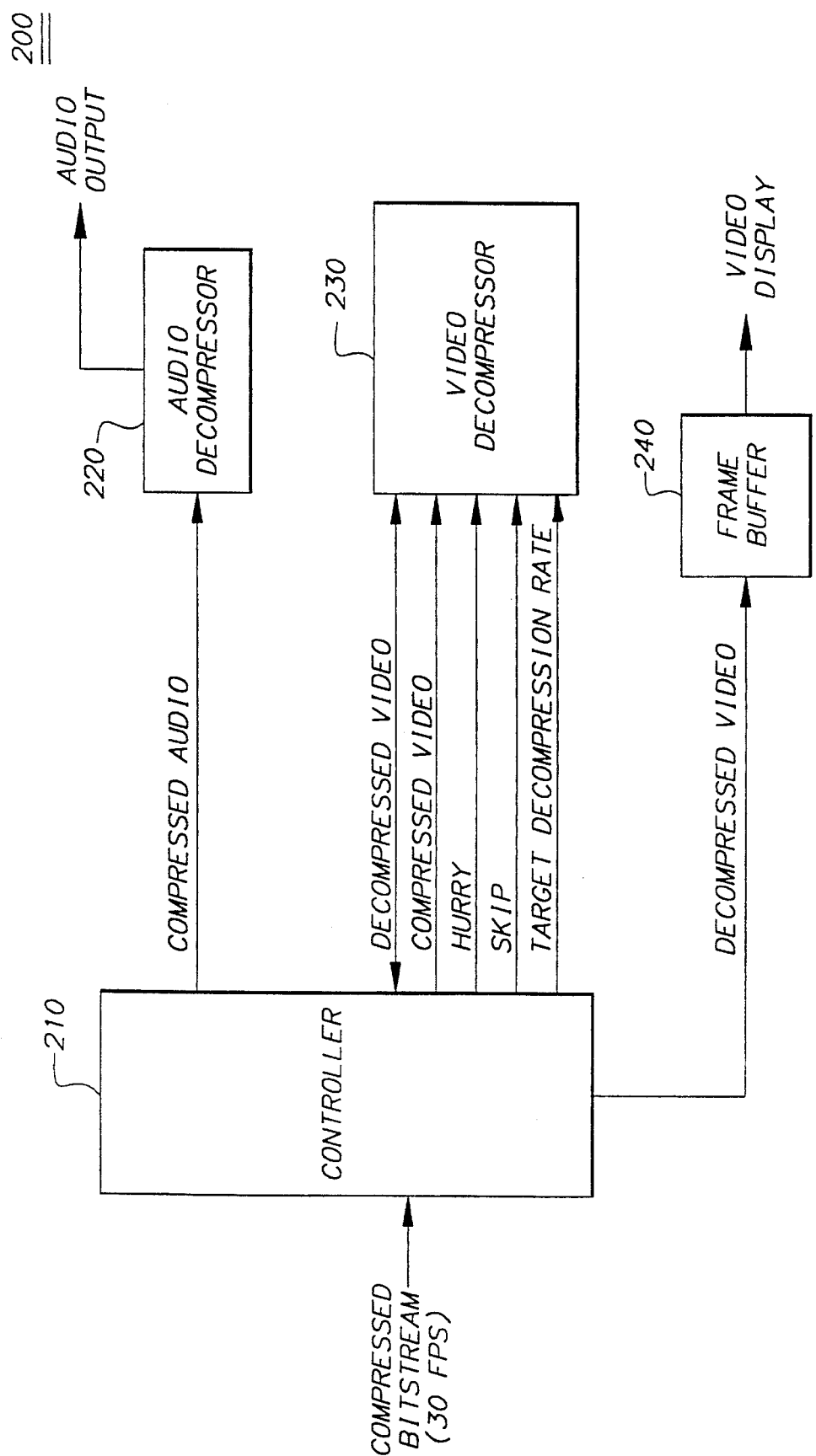
FIG. 2 is a block diagram showing the operation of a video decompression system according to an alternative preferred embodiment of the present invention.

Referring now to FIG. 2, there is shown an overall block diagram illustrating the operation of a decompression system 200 according to a further alternative preferred embodiment of the present invention. Decompression system 200 functions substantially the same as decompression system 100, with the exception that in decompression system 200 the skip signals are generated by controller 110 and provided to video decompressor 230.

Figure 3:
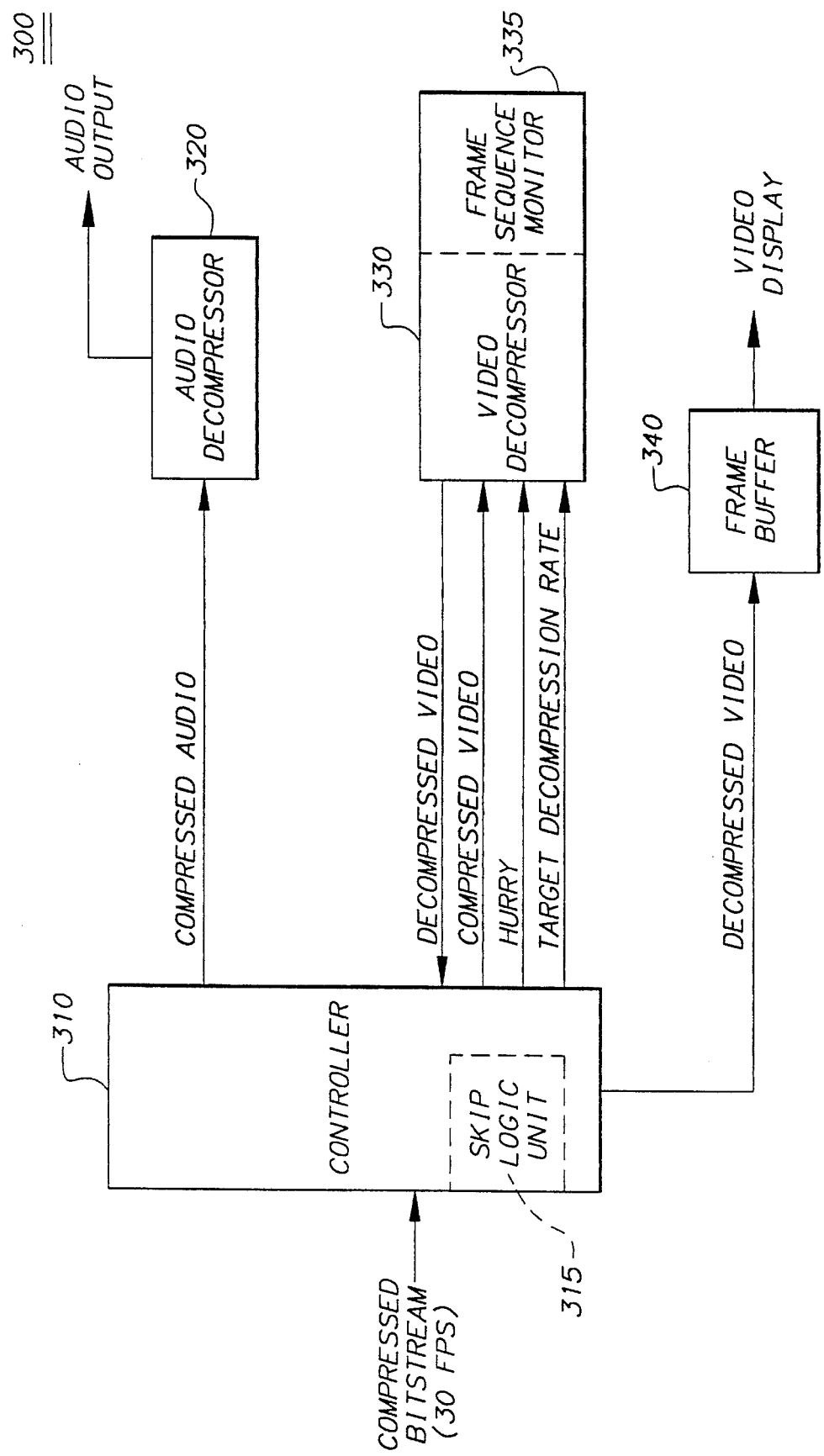
FIG. 3 is a block diagram showing the operation of a video decompression system according to a further alternative preferred embodiment of the present invention.

Referring now to FIG. 3, there is shown an overall block diagram illustrating the operation of a decompression system 300 according to a still further alternative preferred embodiment of the present invention. Decompression system 300 functions substantially the same as decompression system 100, with the exception that in decompression system 300, no skip signals are generated by the video decompressor 330. In decompression system 300, skip logic unit 315 is integral with controller 310 and generates skip signals internally within controller 310. In response to each internal skip signal generated by skip logic unit 315, controller 310 omits one or more compressed frames from the compressed video signal being provided to video decompressor 330. Each video frame represented in the compressed bitstream provided to controller 310 preferably includes a header identifying the numerical position of the frame (e.g., first frame, second frame, etc.) within the digital video sequence. Frame sequence monitor 335 is provided for monitoring the numerical position information associated with each compressed frame that is provided to video decompressor 330 by controller 310. By monitoring the numerical position information associated with each such compressed frame, frame sequence monitor 335 is able to detect whether compressed frames have been omitted from the compressed digital video sequence provided by controller 310.

Figure 5:
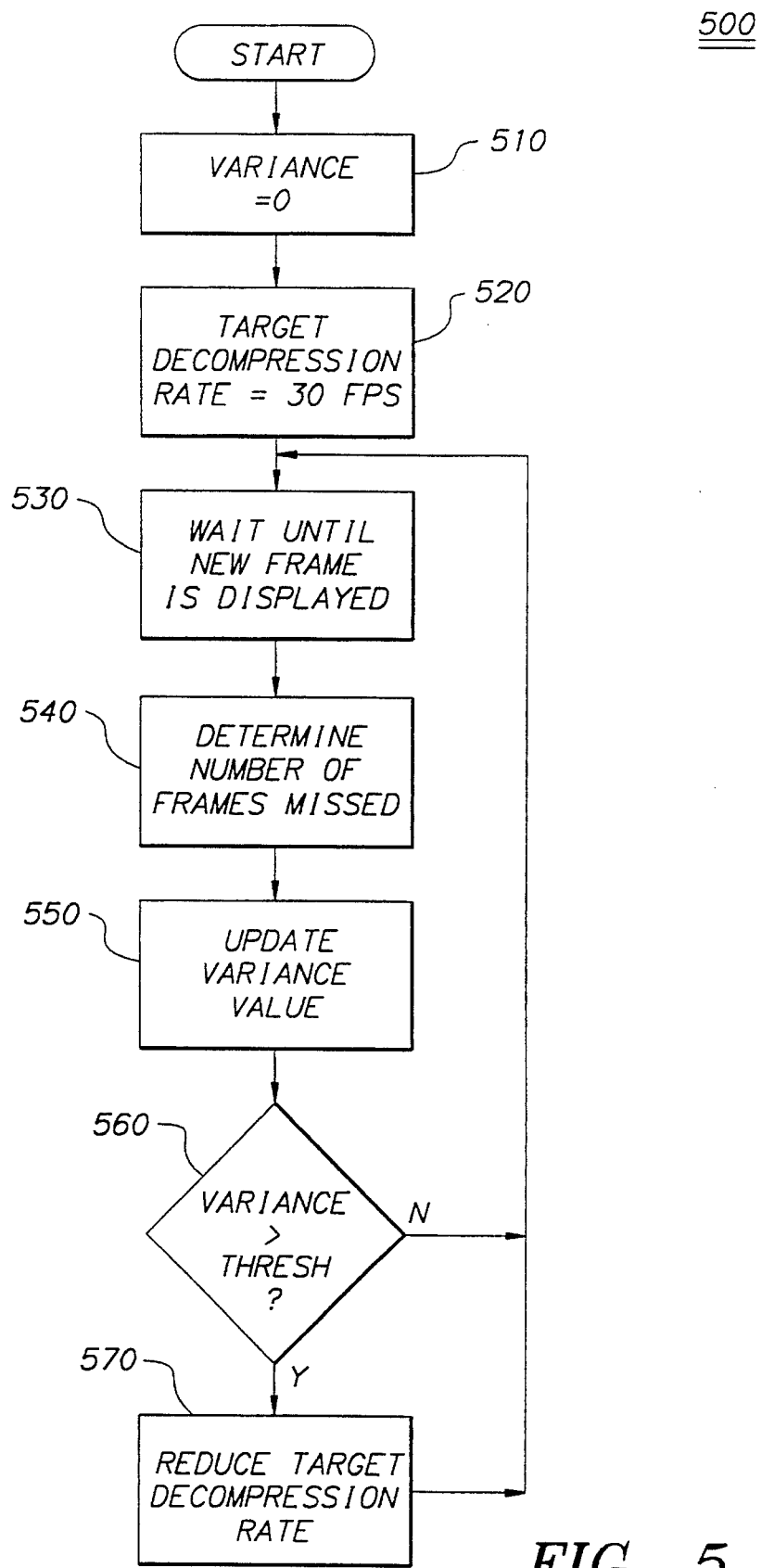
FIG. 5 is a flow diagram showing the operation of a controller according to a preferred embodiment of the present invention.

Referring now to FIG. 5, there is shown a flow diagram illustrating the operation of controller 110 according to a preferred embodiment of the present invention. Initialization means 510 is provided for initializing a variance value to zero. As explained more fully below, the variance value is used to monitor deviations in the number of frames that are omitted from the display sequence of decompressed digital video frames during the video decompression process. Target decompression rate initialization means 520 are provided for initially setting the decompression rate of video decompressor 130 to the maximum frame rate of the compressed bitstream. In a preferred embodiment, the compressed bitstream provided to controller 110 will have been compressed at a maximum frame rate of 30 frames per second (FPS) and in such cases initialization means 520 will initially set the target decompression rate of video decompressor 130 to 30 FPS. As shown in FIG. 1, controller 110 preferably controls the target decompression rate of video decompressor 130 via a target decompression rate signal. In the preferred embodiment, initialization means 520 also initializes the value of the threshold (to be used by comparator 560), and initialization means 520 derives a value representing the periodicity of key frames in the digital video sequence being decompressed. The system used by initialization means 520 to determine the value of the threshold to be used by comparator 560 is described below in conjunction with FIG. 6.

Referring still to FIG. 5, monitoring means 530 are providing for waiting until a previously undisplayed decompressed frame is provided by video decompressor 130 to controller 110. Each time video decompressor 130 sends a new decompressed frame to controller 110, means 540 determines a frames missed value. This frames missed value represents the number of compressed video frames that were present in the compressed bitstream provided to controller 110 but which were omitted from the display sequence of decompressed video frames provided to controller 110 between the current decompressed frame just received by controller 110 and the decompressed frame previously received by controller 110. The number of frames that were omitted from the display sequence between the current and previously received frames will include the number of frames that were either not displayed or decompressed as a result of hurry or skip signals generated between the time the current decompressed video frame is received by controller 110 and the time the previous decompressed video frame was received by controller 110. The number of frames that were omitted from the display sequence between the current and previously received frames will also include the number of frames that were not decompressed as a result any reductions in the target frame decompression rate triggered by activation of means 570. (The operation of means 570 is explained more fully below). Means 550 generates and stores a new frames missed value each time a new decompressed video frame is provided to controller 110. Variance determining means 550 is also provided for calculating the statistical variance of a plurality of previous frames missed values each time a new decompressed video frame is provided to controller 110. In the preferred embodiment, variance determining means 550 calculates the statistical variance of all previous frames missed values. In alternate embodiments, variance determining means 550 calculates the statistical variance of 50–100 previous frames missed values. In still further embodiments, determining means 550 may calculate the statistical variance of less than 50 or more than 100 previous frames missed values. In any case, a high variance value indicates that video compressor 130 is irregularly omitting decompressed video frames from the sequence of frames it is providing to controller 110.

Referring still to FIG. 5, comparator 560 is provided for comparing the variance value determined by means 550 to a predetermined threshold. In the preferred embodiment, where the compressed bitstream provided to controller 110 has been compressed at a maximum frame rate of 30 FPS, the predetermined threshold used by comparator 560 is determined in accordance with system 600 described below. If comparator 560 determines that the threshold has been exceeded, then target frame rate reduction means 570 adjusts downward the target frame decompression rate of video decompressor 130. In the preferred embodiment, each time comparator 560 determines that its threshold has been exceeded, the target frame decompression rate of video decompressor 130 is successively reduced to a slower and slower decompression rate in accordance with the target decompression rates shown in FIGS. 7A, 7B, 7C and 7D.

Figure 6:
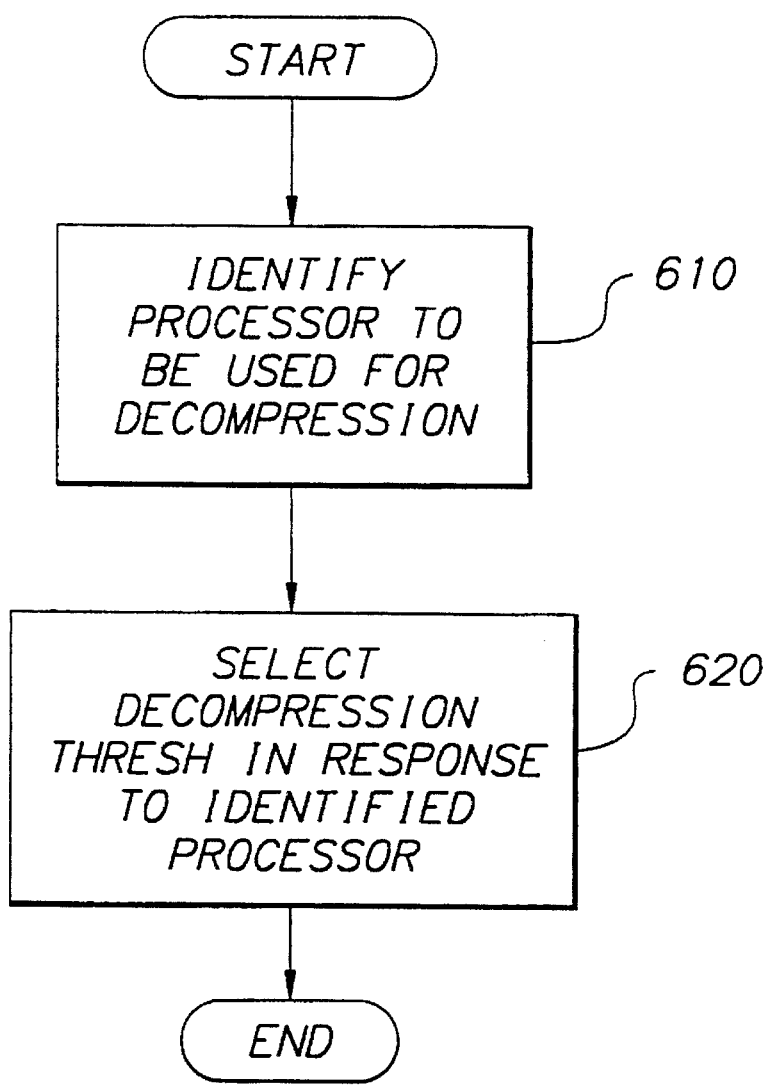
FIG. 6 is a flow diagram showing the operation of a system for selectively initializing a decompression threshold in response to the processing power of decompressing hardware being used for video decompression according to a preferred embodiment of the present invention.

Referring now to FIG. 6, there is shown a flow diagram of a system 600 for selectively initializing a decompression threshold in response to the processing capabilities of the decompressing hardware being used to decompress the compressed bitstream. System 600 includes means 610 for sensing and identifying the processor being used to decompress the compressed bitstream. Threshold selector 620 is provided for selecting a decompression threshold (THRESH) from a plurality of candidate decompression threshold values in accordance with the processing power of the hardware used to implement the video decompressor. More particularly, in the preferred embodiment, if means 610 determines that the processor or platform being used for video decompression has processing power equivalent to that of an Intel 386 processor, then threshold selector 620 sets the decompression threshold to 5. Alternatively, if means 610 determines that the processor being used for video decompression has processing power equivalent to that of an Intel 486 processor, then threshold selector 620 sets the decompression threshold to 3.

Referring now to FIG. 7A, there is shown a table illustrating a strategy employed by means 570 for successively reducing the target decompression rate of a compressed digital video sequence encoded at a maximum frame rate of 30 FPS and comprised entirely of key frames according to a preferred embodiment of the present invention. For purposes of the present invention, a key frame in the compressed bitstream represents a video frame that has been encoded without reference to any other frames in the sequence. By contrast, a difference (or delta) frame in the compressed sequence represents a video frame that has been encoded based on differences between the difference frame and another video frame in the sequence. Among other things, as shown in FIGS. 7A, 7B, 7C, 7D below, it is an object of the present invention to maintain as constant the number of compressed video frames that are either not displayed or not decompressed between each decompressed frame that is output to frame buffer 140.

As shown in FIG. 7A which is directed to compressed video sequences comprises entirely of key frames, the target decompression rate of video decompressor 130 is initially set to 30 FPS. However, when comparator 560 first determines that its threshold has been exceeded, then target frame rate reduction means 570 adjusts the target frame decompression rate of video decompressor 130 downward to 15 FPS. Video decompressor 130 implements the reduced frame rate of 15 FPS by not decompressing every other frame in the compressed video sequence. If, after the target decompression rate has been reduced to 15 FPS, comparator 560 again determines that its threshold has been exceeded, then target frame rate reduction means 570 adjusts the target frame decompression rate of video decompressor 130 downward to 10 FPS. Video decompressor 130 implements the reduced frame rate of 10 FPS by only decompressing every third frame in the compressed video sequence. Similarly, if after the target decompression rate has been reduced to 10 FPS, comparator 560 again determines that its threshold has been exceeded, then target frame rate reduction means 570 adjusts the target frame decompression rate of video decompressor 130 downward to 7.5 FPS. Video decompressor 130 implements the reduced frame rate of 7.5 FPS by only decompressing every fourth frame in the compressed video sequence. Again, if after the target decompression rate has been reduced to 7.5 FPS, comparator 560 again determines that its threshold has been exceeded, then target frame rate reduction means 570 adjusts the target frame decompression rate of video decompressor 130 downward to 6 FPS. Video decompressor 130 implements the reduced frame rate of 6 FPS by only decompressing every fifth frame in the compressed video sequence. Finally, if after the target decompression rate has been reduced to 6 FPS, comparator 560 again determines that its threshold has been exceeded, then target frame rate reduction means 570 adjusts the target frame decompression rate of video decompressor 130 downward to 5 FPS. Video decompressor 130 implements the reduced frame rate of 5 FPS by only decompressing every sixth frame in the compressed video sequence.

Referring now to FIG. 7B, there is shown a table illustrating a strategy employed by means 570 for successively reducing the target decompression rate of a compressed digital video sequence encoded at a maximum frame rate of 30 FPS where every other frame has been encoded as a key frame according to a preferred embodiment of the present invention. In the embodiment shown, the target decompression rate of video decompressor 130 is initially set to 30 FPS. However, when comparator 560 first determines that its threshold has been exceeded, then target frame rate reduction means 570 adjusts the target frame decompression rate of video decompressor 130 downward to 15 FPS. Video decompressor 130 implements the reduced frame rate of 15 FPS by not decompressing any of the difference frames in the compressed video sequence. It was found that only minimal processing time could be saved if these difference frames were decompressed, but not displayed. It is for this reason that, in the preferred embodiment shown in FIG. 7A, the first backoff strategy omits from the decompression process both decompression and display of all difference frames. If, after the target decompression rate has been reduced to 15 FPS, comparator 560 again determines that its threshold has been exceeded, then target frame rate reduction means 570 adjusts the target frame decompression rate of video decompressor 130 downward to 7.5 FPS. Video decompressor 130 implements the reduced frame rate of 7.5 FPS by only decompressing every other key frame in the compressed video sequence. Finally, if after the target decompression rate has been reduced to 7.5 FPS, comparator 560 again determines that its threshold has been exceeded, then target frame rate reduction means 570 adjusts the target frame decompression rate of video decompressor 130 downward to 5 FPS. Video decompressor 130 implements the reduced frame rate of 5 FPS by only decompressing every fourth key frame in the compressed video sequence.

Referring now to FIG. 7C, there is shown a table illustrating a strategy employed by means 570 for successively reducing the target decompression rate of a compressed digital video sequence encoded at a maximum frame rate of 30 FPS where every third frame has been encoded as a key frame according to a preferred embodiment of the present invention. In the embodiment shown, the target decompression rate of video decompressor 130 is initially set to 30 FPS. However, when comparator 560 first determines that its threshold has been exceeded, then target frame rate reduction means 570 adjusts the target frame decompression rate of video decompressor 130 downward to 10 FPS. Video decompressor 130 implements the reduced frame rate of 10 FPS by not decompressing any of the difference frames in the compressed video sequence. It was found that only minimal processing time could be saved if only every other difference frame (as opposed to all difference frames) were not decompressed during the decompression process. It was also found that the strategy of only decompressing every other difference frame produced a result that appeared jerky and visually displeasing. It is for this reason that, in the preferred embodiment shown in FIG. 7C, the first backoff strategy eliminates all difference frames from the decompression process. If, after the target decompression rate has been reduced to 10 FPS, comparator 560 again determines that its threshold has been exceeded, then target frame rate reduction means 570 adjusts the target frame decompression rate of video decompressor 130 downward to 6 FPS. Video decompressor 130 implements the reduced frame rate of 6 FPS by only decompressing every other key frame in the compressed video sequence.

Referring now to FIG. 7D, there is shown a table illustrating a strategy employed by means 570 for successively reducing the target decompression rate of a compressed digital video sequence encoded at a maximum frame rate of 30 FPS where every fourth frame has been encoded as a key frame according to a preferred embodiment of the present invention. In the embodiment shown, the target decompression rate of video decompressor 130 is initially set to 30 FPS. However, if comparator 560 determines that its threshold has been exceeded, then target frame rate reduction means 570 adjusts the target frame decompression rate of video decompressor 130 downward to 7.5 FPS. Video decompressor 130 implements the reduced frame rate of 7.5 FPS by not decompressing any of the difference frames in the compressed video sequence.

It will be understood by those skilled in the art that the tables shown in FIGS. 7A, 7B, 7C and 7D are illustrative of several preferred strategies employed by means 570 for reducing target decompression rates and that means 570 may be adapted to successively reduce the target decompression rates of digital video sequences having key frame periodicities other than those shown.

The present invention may be implemented using an Intel model 386, 486 or a higher powered processor, or a general purpose processor. The present invention may be embodied in other specific forms without departing from the spirit or essential attributes of the invention. Accordingly, reference should be made to the appended claims, rather than the foregoing specification, as indicating the scope of the invention.

What is claimed is:

1. A method for forming a decompressed digital video output signal with a video decompressor from a compressed digital video signal representative of an input sequence of digital video frames, comprising the steps of:

(A) determining the processing power associated with said video decompressor, said processing power related to a rate of processing data;

(B) selecting a decompression threshold value from a plurality of candidate decompression threshold values in accordance with said processing power associated with said video decompressor;

(C) generating with said video decompressor said decompressed digital video output signal in response to said compressed digital video signal;

(D) monitoring said decompressed digital video output signal to determine whether said video decompressor is timely generating an output sequence of decompressed digital video frames; and (E) omitting compressed digital video frames from said compressed digital video signal provided to said video decompressor in response to said monitoring step and in accordance with said decompression threshold.

2. The method of claim 1, wherein step (E) further comprises the steps of:

(i) generating a frames missed value in response to said omitted frames;

(ii) monitoring deviations in said frames missed value; and (iii) selectively adjusting downward a target decompression rate associated with said video decompressor in accordance with said deviations in said frames missed value.

3. The method of claim 2, wherein step (E)(ii) comprises the steps of:

a. storing a plurality of frames missed values; and b. determining a variance value in accordance with a statistical variance of said plurality of frames missed values.

4. The method of claim 3, wherein step (E)(iii) comprises the steps of:

i. comparing said variance value to said decompressor threshold; and ii. if said variance value exceeds said decompression threshold, then adjusting downward said target decompression rate.

5. The method of claim 4, wherein said target decompression rate is repeatedly adjusted downward until said variance value does not exceed said decompression threshold.

6. The method of claim 1, wherein said input sequence of digital video frames has a sequence of audio frames associated therewith, wherein step (D) comprises the step of monitoring said decompressed digital video output signal to determine whether said decompressed digital video output signal is lagging in time behind an audio decompressor output signal.

7. An apparatus for forming a decompressed digital video output signal with a video decompressor from a compressed digital video signal representative of an input sequence of digital video frames, comprising:

(A) sensing means for determining the processing power associated with said video decompressor, said processing power related to a rate of processing data;

(B) a threshold selector for selecting a decompression threshold value from a plurality of candidate decompression threshold values in accordance with said processing power associated with said video decompressor;

(C) said video decompressor including means for generating said decompressed digital video output signal in response to said compressed digital video signal;

(D) means for monitoring said decompressed digital video output signal to determine whether said video compressor is timely generating an output sequence of decompressed digital video frames; and (E) means for omitting compressed digital video frames from said compressed digital video signal provided to said video decompressor in response to said monitoring step and in accordance with said decompression threshold.

8. The apparatus of claim 7, wherein said means for omitting compressed digital video frames further comprises:

(i) means for generating a frames missed value in response to said omitted frames;

(ii) means for monitoring deviations in said frames missed value; and (iii) target decompression rate adjustment means for selectively adjusting downward a target decompression rate associated with said video decompressor in accordance with said deviations in said frames missed value.

9. The apparatus of claim 8, wherein said means for monitoring deviations in said frames missed value comprises:

a. means for storing a plurality of frames missed values; and b. means for determining a variance value in accordance with a statistical variance of said plurality of frames missed values.

10. The apparatus of claim 9, wherein said target decompression rate adjustment means comprises:

i. a comparator for comparing said variance value to said decompressor threshold; and ii. means for adjusting downward said target decompression rate if said variance value exceeds said decompression threshold.

11. The apparatus of claim 10, wherein said target decompression rate is repeatedly adjusted downward by said target decompression rate adjustment means until said variance value does not exceed said decompression threshold.

12. The apparatus of claim 7, wherein said input sequence of digital video frames has a sequence of audio frames associated therewith, wherein said means for monitoring said decompressed digital video output signal comprises means for monitoring said decompressed digital video output signal to determine whether said decompressed digital video output signal is lagging in time behind an audio decompressor output signal.

* * * * *